United States Patent [19]

Dautartas

[11] Patent Number: 5,257,336
[45] Date of Patent: Oct. 26, 1993

[54] OPTICAL SUBASSEMBLY WITH PASSIVE OPTICAL ALIGNMENT

[75] Inventor: Mindaugas F. Dautartas, Alburtis, Pa.

[73] Assignee: AT&T Bell Laboratories, Murray Hill, N.J.

[21] Appl. No.: 933,418

[22] Filed: Aug. 21, 1992

[51] Int. Cl.⁵ .............................. G02B 6/00; G02B 6/36
[52] U.S. Cl. ............................................................ 385/93
[58] Field of Search ................. 357/17, 19; 385/93, 385/88; 359/642

[56] References Cited

U.S. PATENT DOCUMENTS

| | | | |
|---|---|---|---|
| 3,950,075 | 4/1976 | Cook et al. | 385/93 |
| 4,383,731 | 5/1983 | Simon et al. | 385/93 X |
| 4,639,077 | 1/1987 | Dobler | 385/93 X |
| 4,653,847 | 3/1987 | Berg et al. | 385/93 X |
| 4,658,130 | 4/1987 | Durbin | 385/93 X |
| 4,707,067 | 11/1987 | Haberland et al. | 385/93 X |
| 4,726,648 | 2/1988 | Haberland et al. | 385/93 |
| 4,744,626 | 5/1988 | Mery | 350/96.20 |
| 4,753,508 | 6/1988 | Meuleman | 385/93 |
| 4,779,946 | 10/1988 | Pimpinella et al. | 350/96.20 |
| 4,824,202 | 4/1989 | Auras | 385/93 |
| 4,945,400 | 7/1990 | Blonder et al. | 357/74 |
| 4,989,943 | 2/1991 | Yoshinaga et al. | 385/93 X |
| 5,107,537 | 4/1992 | Schriks et al. | 385/93 X |

Primary Examiner—Akm E. Ullah
Attorney, Agent, or Firm—Wendy W. Koba

[57] ABSTRACT

An optical subassembly is disclosed which provides for passive alignment between an active optical device, lens and optical fiber. A first substrate is used as a mount for the active optical device and a second substrate is formed to include an aperture designed to capture the lens. Alignment fiducials formed on the mating surfaces of the first and second substrates provide accurate optical alignment between the active device and the lens. An optical fiber receptacle is formed to mate with the optical header supporting the substrates and thus provide alignment between the optical fiber and the active device/lens configuration. Preferably, the receptacle is formed to prevent physical contact with the aligned substrates, so that any movement of the receptacle will not effect the alignment between the device and lens.

13 Claims, 3 Drawing Sheets

OPTICAL SUBASSEMBLY WITH PASSIVE OPTICAL ALIGNMENT

BACKGROUND OF THE INVENTION

1. Technical Field

The present invention relates to an optical subassembly and, more particularly, to an optical subassembly which utilizes passive alignment techniques to assemble the active device, lens and associated fiber in a unitary subassembly arrangement.

2. Background of the Invention

In the realm of optical device packaging, there is beginning to develop a number of assemblies which utilize a single crystal semiconductor material (such as silicon) as the support structure for the various optical devices. Often referred to as "silicon optical bench" technology, the utilization of silicon may result in a significant cost saving in optical packaging over some of the more esoteric materials which have been used in the past. More importantly, silicon processing technology has advanced to the stage where a number of relatively simple procedures (e.g., oxidation, etching, isotropic or anisotropic) may be utilized to facilitate attachment of the devices to the support member, as well as alignment therebetween. Further, it is possible to form optical waveguiding structures directly in/on a silicon substrate, resulting in the ability to form a completely operable subassembly in silicon.

An exemplary utilization of silicon in the formation of a subassembly for optoelectronic devices is disclosed in U.S. Pat. No. 4,945,400 issued Jul. 31, 1990 to G. E. Blonder et al. and assigned to the assignee of record in this application. In general, Blonder et al. disclose a subassembly including a semiconductor (e.g., silicon) base and lid including a variety of etched features (e.g., grooves, cavities, alignment detents) and metallization patterns (e.g., contacts, reflectors) which enable the optoelectronic device to be reliably and inexpensively mounted on the base and coupled to a communicating optical fiber. In particular, Blonder et a. disclose an arrangement wherein the optoelectronic device (e.g., LED) is disposed within a cavity formed by a lid member and the communicating fiber is positioned along a groove formed in a base member. A reflective metallization is utilized to optically couple the device to the fiber. Therefore, positioning of the device over the reflector is the only active alignment step required to provide coupling. Any remaining alignments are accomplished utilizing fiducial features formed in the base and lid members.

Although the Blonder et al. subassembly represents a significant advance in the field of silicon optical bench packaging, a need remains for providing an arrangement which requires no active alignments to be performed. The provision of a completely passive optical packaging arrangement being considered both more reliable and less expensive than virtually any alternative requiring active alignment between components.

SUMMARY OF THE INVENTION

The need remaining in the prior art is addressed by the present invention relates to an optical subassembly and, more particularly, to an optical subassembly which utilizes passive alignment techniques to assemble the active device, lens and associated fiber in a unitary subassembly arrangement.

In accordance with a preferred embodiment of the present invention, a first substrate is utilized as a mount for the active optical device, with alignment fiducials formed at predetermined locations with respect to the placement of the active device. A second substrate is utilized as a lens holder (by virtue of an opening formed through the second substrate) and also includes alignment fiducials which will mate with the fiducials formed on the first substrate so as to provide mechanical joining of the two substrates and, advantageously, optical alignment between the lens and the active device (by virtue of accurate placement of the fiducials). An optical fiber receptacle is formed to mate with the structure supporting the aligned substrates and thus provide optical alignment between the fiber and the aligned active device and lens.

The substrates utilized in practicing the invention may be silicon or any other suitable material which may be processed to include the various features (i.e., alignment fiducials, openings) with the accuracy required to provide optical alignment.

An advantage of the arrangement of the present invention is that the substrate used as a device mount may be located within a conventional support structure used to provide the necessary electrical connections to the active device.

Other and further advantages of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
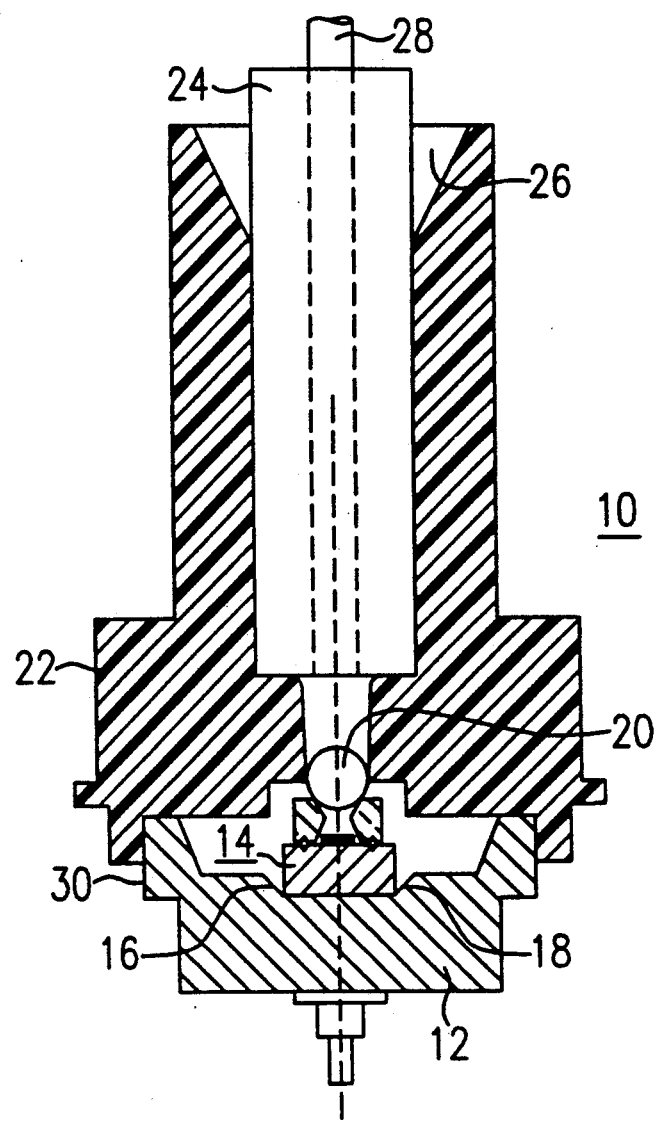
FIG. 1 illustrates an optical subassembly formed in accordance with the present invention.

FIG. 1 illustrates an exemplary optical subassembly 10 formed in accordance with the teachings of the present invention. In general, optical subassembly 10 includes an optical header 12 which is used to support an active optical device and provide electrical connections to the device. In accordance with the teachings of the present invention, an aligned optical substrate configuration 14 is disposed within a depression 16 formed in header 12. As will be described in detail below in association with FIGS. 2–4, aligned substrate configuration 14 is formed to both support an active optical device 18 and provide alignment between active device 18 and a coupling lens 20. An optical fiber receptacle 22 is illustrated as attached to header 12, with a fiber ferrule 24 inserted within an axial bore 26 of receptacle 22. An optical fiber 28 is included, as shown, within ferrule 24.

As mentioned above, an advantage of the design of the present invention as illustrated in FIG. 1 is the ability to provide completely passive optical alignment between active device 18, coupling lens 20, and optical fiber 28. To analyze this alignment, it is helpful to discuss the actual assembly process used to attach the various components to each other: (1) Initially, as will be discussed in detail below, submount piece part 32 for supporting active device 18 is positioned with depression 16 formed in header 12. The location of depression 16 may be controlled, with respect to the outer periphery 30 of header 12, within a tolerance of approximately ±2 mil. Active device 18 is then positioned on a solder preform formed on submount 32 (as will be discussed in detail below) and the solder is reflowed to provide alignment of active device 18 with respect to alignment fiducials on piece part 32 (see FIG. 5). (2) The next step in the process is to attach submount piece part 38 (including coupling lens 20) to piece part 32 so as to form aligned submount configuration 14. As will be discussed in detail below, the ability to provide alignment fiducials on piece parts 32 and 38 results in alignment of active device 18 to coupling lens 20 within a tolerance of ±2 μm. (3) Receptacle 22 (including ferrule 24 within bore 26) is next attached to header 12, as shown in FIG. 1, so as to be in physical contact with the outer periphery 30 of header 12. The fabrication process utilized to form receptacle 22 allows for bore 26 to be located within the center of receptacle 22 within a tolerance of ±0.2 mil. The actual attachment of receptacle 22 to header 12 provides initial alignment of approximately 2-3 mil. (4) The process of attaching receptacle 22 to header 12 results in the capturing of lens 20 within axial bore 26, (with, preferably, a predetermined minimal clearance between piece parts) where the alignment of lens 20 with bore 26 will be within the range of ±0.2-0.3 mil. As a result of these process steps, therefore, optical fiber 28 (located within ferrule 24 inside bore 26) will be aligned to the previously aligned combination of coupling lens 20 and active device 18 (as described in step (1)), the fiber to lens alignment being within the range of ±0.2-0.3 mil. Thus, the passive attachment scheme of the present invention results in an optical subassembly with alignment between components well within acceptable values.

The mechanical design of the inventive optical subassembly is also important to the reliability of the arrangement. In particular, as seen by reference to FIG. 1, receptacle 22 may be formed so as to avoid physical contact with aligned optical substrate configuration 14. Therefore, any unexpected movement of receptacle 22 will not effect the optical alignment between active device 18 and lens 20. Further, any mechanical force exerted by ferrule 24 onto receptacle 22 is transferred to header 12, and will not disturb the optical alignments described above. As seen, therefore, the mechanical design of the present optical subassembly which decouples the optical alignments from the mechanical mating of the receptacle to the header is critical, since the critical alignment is between device 18 and lens 20 (controlled within ±5 μm), with the alignment between optical fiber 28 and configuration 14 being more forgiving (±0.5 mil). Thus, when mated, the various piece parts provide optical alignment between the active device and the optical fiber.

Figure 2:
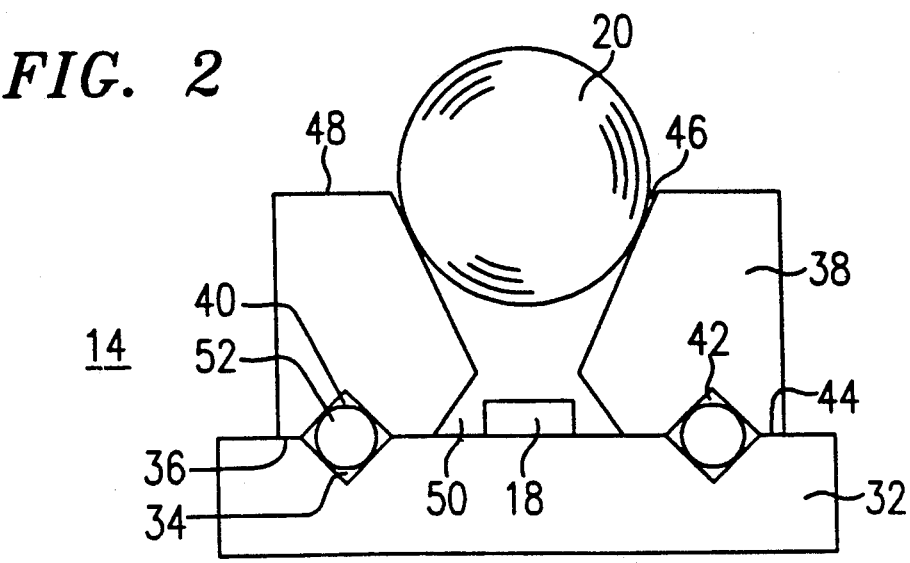
FIGS. 2–4 illustrate various optical substrate configurations which may be utilized in accordance with the teachings of the present invention to provide optical alignment between the active device and coupling lens.

FIG. 2 illustrates, in a detailed view, an exemplary aligned optical substrate configuration 14 formed in accordance with the teachings of the present invention. As shown, subassembly 14 includes a first substrate member 32 which is utilized as a mount for active device 18 (for example, an LED, photodiode or laser). The position of active device 18 with respect to first member 32 may be controlled by a solder self-alignment technique, as discussed in detail below in association with FIG. 5. Referring again to FIG. 2, a plurality of alignment fiducials 34 are formed at predetermined locations on top surface 36 of substrate 32. For example, alignment fiducials 34 may comprise pyramidal detents formed in surface 36 of first substrate 32. Substrate 32 may comprise any suitable material, including but not limited to, silicon. A second substrate member 38 is utilized as a holder for lens 20, as shown in FIG. 2. Further, second substrate 38 includes a plurality of alignment fiducials 40 which will mate with alignment fiducials 34 of first substrate 32 upon attachment of the first and second members. As shown in FIG. 2, second substrate 38 is processed to include alignment fiducials 42 on a first surface 44, while capturing lens 20 in a larger aperture 46 formed within the opposing surface 48. An additional opening 50 is formed in first surface 44 to accommodate active device 18 and provide an unobstructed optical signal path between active device 18 and lens 20. For the particular embodiment illustrated in FIG. 2, alignment fiducials 34 and 42 are formed as pyramidal detents, with spherical members 52 disposed therebetween. When first and second substrates 32, 38 are joined, spherical members 52 are in physical contact with both sets of pyramidal detents 34,42, providing mechanical joining of first substrate 32 to second substrate 38, as well as optical alignment between active device 18 and lens 20. In this particular configuration, surfaces 36 and 42 are in physical contact after mating. The dimensions of this configuration are such that when used with an optical transmitting device, a collimated beam will exit lens 20 (when used with an optical receiving device, therefore, a collimated incoming beam will be focused on the active region of device 18).

Figure 3:
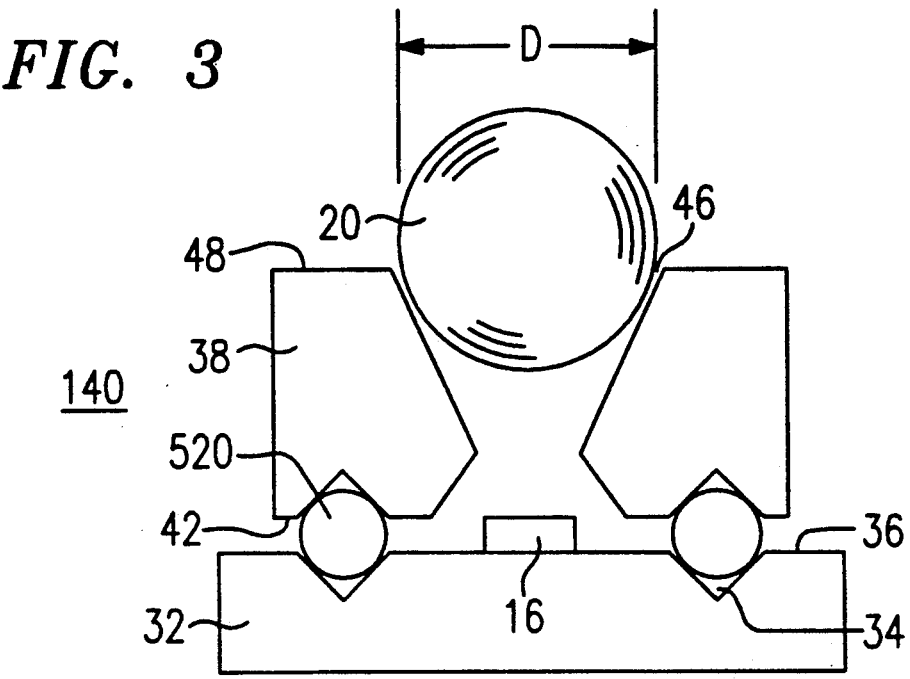
Figure 4:
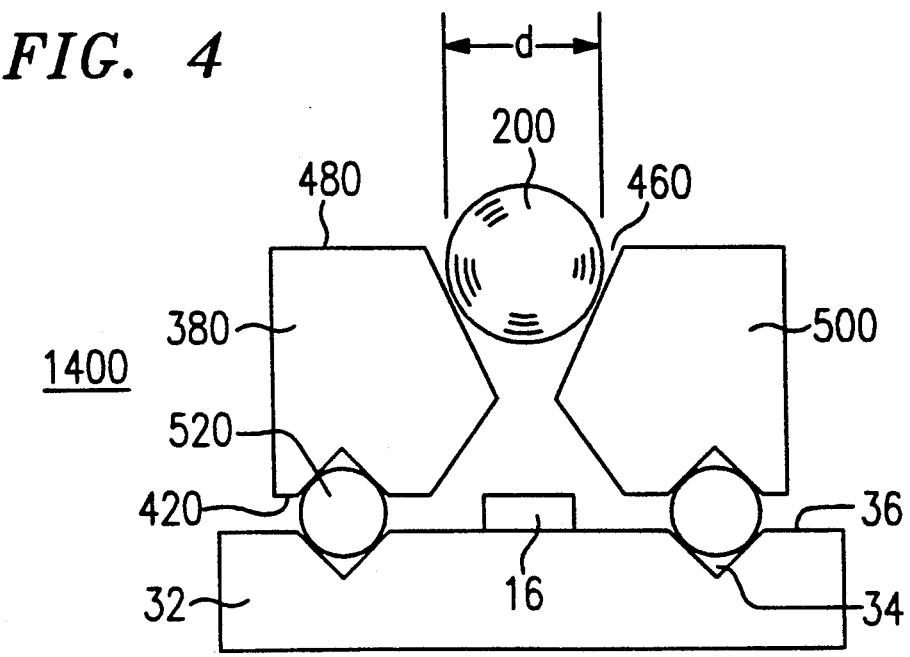

Depending upon the numerical aperture of the active device and the size of the lens, various parameters of aligned optical substrate configuration 14 may be controlled to provide optimal coupling efficiency between device 18 and lens 20. FIG. 3 illustrates an alternative aligned optical substrate configuration 140 wherein a larger optical alignment sphere 520 is utilized to provide separation between first substrate 32 and second substrate 38, which may be necessary with certain active devices 18 to maximize coupling efficiency. The dimensions of the various detents and openings in substrates 32,38 are essentially identical to those of configuration 14 of FIG. 2. Therefore, an advantage of the arrangement of the present invention is that coupling efficiency may easily be achieved merely by careful choice of the spheres used to control the separation between substrates 32,38. The only constraint on sphere dimension being, obviously, that the spheres must remain in physical contact with alignment fiducials 34,40. As an alternative, the size of coupling lens 20 may also be varied to maximize coupling efficiency. FIG. 4 illustrates an exemplary aligned optical substrate configuration 1400 utilizing a coupling lens 200 with a smaller diameter d than the diameter D of coupling lens 20 (as illustrated in FIG. 3). As shown in FIG. 4, opening 460 in second substrate 380 may be modified so as to physically capture smaller lens 200. It is to be understood that any desired combination of substrate separate, lens size, or even substrate size may be used to provide maximum coupling efficiency between active device 18 and lens 20 in accordance with the teachings of the present invention.

Figure 5:
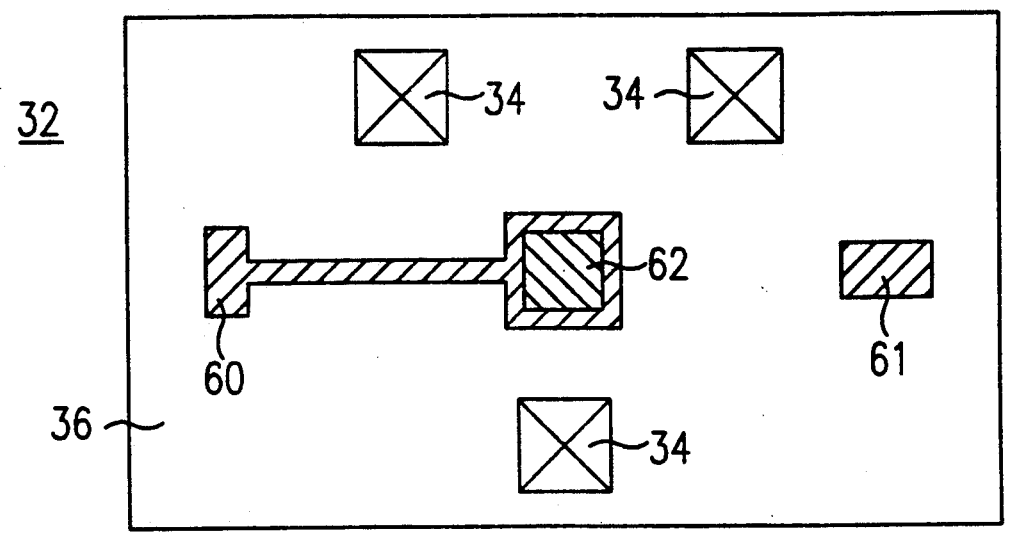
FIG. 5 illustrates a top view of an exemplary substrate which may be utilized as a mount for the active optical device.

A necessary element in providing optical alignment between active device 18 and lens 20, regardless of the dimensions of configuration 14, is the ability to accurately position active device 18 with respect to alignment fiducials 34. FIG. 5 contains a top view perspective of first substrate 32, indicating the position of an exemplary arrangement of three such alignment fiducials 34 with the position of electrical bond pads 60 and a solder preform 62 (or other suitable disposed/deposited solder), where preform 62 is utilized to provide physical attachment and electrical coupling to active device 18 (not shown). Various processes in silicon technology exist such that bond pads 60 may be disposed within ±1 μm tolerance with respect to etched alignment fiducials 34. Active device 18 (not shown) may be located on solder preform 62 and subsequently first substrate 32 is heated to provide physical attachment of active device 18 to electrical bond pads 60. As is known in solder reflow processing, the heating will result in liquifying solder preform 62 such that the surface tension will provide self-alignment of active device 18 to underlying electrical bond pad 60. Therefore, as long as electrical bond pad 60 is formed within a predetermined tolerance with respect to alignment fiducials 34, active device 18 will also be aligned. Although a plurality of three such alignment fiducials is illustrated in FIG. 5, is it to be understood that any desired number of such alignment fiducials may be utilized in association with the teachings of the present invention.

Figure 6:
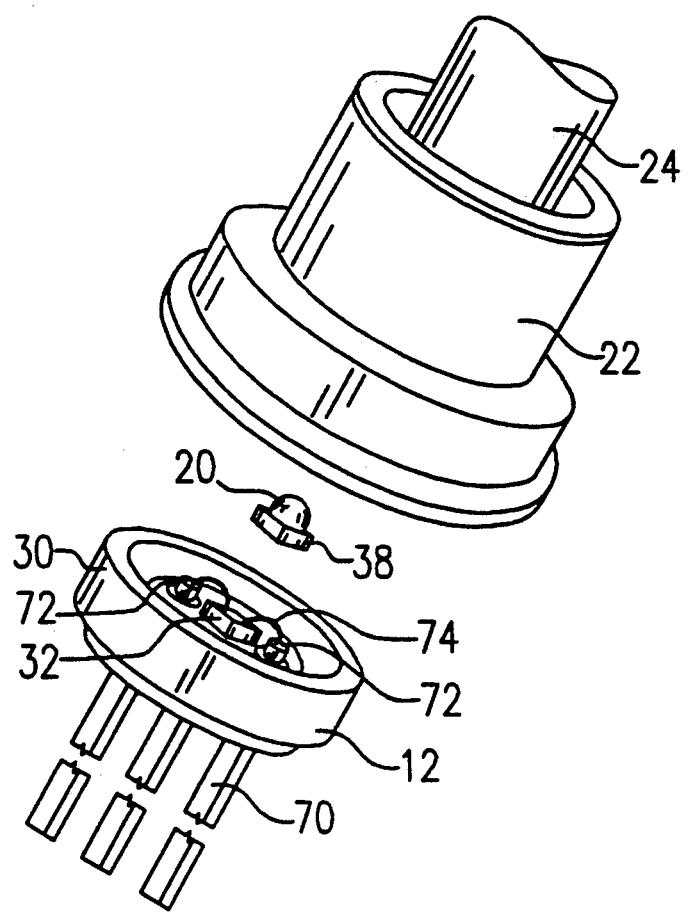
FIG. 6 illustrates, in an exploded view, an optical assembly utilizing the optical subassembly of the present invention.

FIG. 6 illustrates, in an exploded view, a complete assembly utilizing the passive aligned subassembly of the present invention. As shown, first substrate 32 is positioned within depression 16 of header 12, where electrical leads 70 and connections 72 are clearly illustrated in this view. In particular, connections 72 are attached by wirebonds 74 to desired electrical bond pads 60 formed on first substrate 32 (bond pads 60 being visible in the view of FIG. 5). Second substrate 38, including lens 20, is illustrated as positioned between first substrate 32 and receptacle 22. Not obvious from this view, but depicted clearly in FIG. 1, is the provision for receptacle 22 to mate with the outer periphery 30 of header 12 and the subsequent mating of axial bore 26 of receptacle 22 with lens 20, to provide for alignment between fiber 28 and aligned optical substrate configuration 14. Thus, by virtue of the passive alignment arrangement of the present invention, active device 18, coupling lens 20 and fiber 28 will be aligned as the various piece parts are brought together, with no need for any active alignment processes to be used.

It is to be understood that various materials may be used to form the substrate members discussed above in accordance with the teachings of the present invention. Further, other fiducial features (for example, interlocking grooves and ridges) may be used in place of the pyramidal detents discussed above. Many other variations to these and other aspects of the present invention may be made by those skilled in the art and are considered to fall within the spirit and scope of the teachings of the present invention.

I claim:

1. An optical subassembly comprising
an active optical device;
an optical fiber; and
a lens for providing coupling between said active optical device and said optical fiber
CHARACTERIZED IN THAT
the subassembly further comprises
a first substrate for supporting the active optical device and including a plurality of alignment fiducials disposed at predetermined locations with respect to said active optical device location;
a second substrate, comprising top and bottom major surfaces, the top major surface formed to inculde a plurality of alignment fiducials which align with the first substrate alignment fiducials upon attachment of said second substrate to said first substrate and further including an opening to accommodate said active optical device upon mating, and the bottom major surface including an aperture, aligned with and exposing the top surface opening, the bottom surface aperture for holding the coupling lens;
an optical header for supporting the combination of said first and second substrates and providing electrical connections to said active optical device; and
an optical fiber receptacle including an axial bore for accommodating the optical fiber, said receptacle formed to attach to the optical header in a manner such that the coupling lens is captured within the axial bore and the optical fiber is optically aligned with the combination of said first and second substrates.

2. An optical subassembly as defined in claim 1 wherein the optical header includes a depression for supporting the first substrate, the depression being formed at a location determined to provide approximate optical alignment between the active optical device and the optical fiber upon the attached of the optical fiber receptacle to the optical header.

3. An optical subassembly as defined in claim 1 wherein the optical fiber receptacle axial bore is formed to a predetermined tolerance within the optical fiber receptacle so as to capture the coupling lens and provide optical alignment between the optical fiber and the active device.

4. An optical subassembly as defined in claim 1 wherein the alignment fiducials formed in the first and second substrates comprise a plurality of detents, with a like plurality of spheres located therebetween.

5. An optical subassembly as defined in claim 4 wherein the alignment spheres are formed to comprise a diameter capable of providing maximum coupling efficiency between the active optical device and the coupling lens.

6. An optical subassembly as defined in claim 1 wherein the first and second substrates comprise silicon.

7. An optical subassembly as defined in claim 1 wherein the optical fiber receptacle remains physically separated from the first and second substrates subsequent to mating with the optical header.

8. A method of assembling components within an optical subassembly in a manner whereby passive optical alignment between the components is achieved, the method comprising the steps of:
a) providing an active optical device, an optical fiber and a lens for providing coupling between said active optical device and said optical fiber;
b) forming a first substrate to support said active optical device and including a first plurality of alignment fiducials disposed at predetermined locations with respect to said active device location;
c) forming a second substrate to support said coupling lens and including a second plurality of alignment fiducials;

d) attaching said first substrate to said second substrate in a manner whereby the first plurality of alignment fiducials mate to and are aligned with the second plurality of alignment fiducials, resulting in passive optical alignment between said active optical device and said optical fiber;

e) forming an optical fiber receptacle to include an axial bore formed within a predetermined tolerance about the center of said receptacle; and f) mating said optical fiber receptacle to the attached combination of said first and second aligned substrates of step d).

9. The method of claim 8 wherein the method comprises the further steps of:

i) providing an optical header capable of providing electrical connections to an active optical device;

ii) mounting the first substrate of step b) at a predetermined location on optical header of step i); and iii) attaching the optical fiber receptacle of step e) to the optical header of step i), wherein the attachment provides passive optical alignment between said optical fiber receptacle and the aligned combination of said active optical device and said coupling lens.

10. The method of claims 8 or 9 wherein in performing steps b) and c), pyramidal detents are formed as alignment fiducials.

11. The method of claim 10 wherein in performing steps b) and c) the first and second substrates comprise silicon substrates which are etched to form the pyramidal detents.

12. The method of claim 10 wherein in performing step d), spherical members are inserted between the first plurality and the second plurality of alignment fiducials to provide physical contact between the spherical members and the first and second substrates.

13. The method of claim 9 wherein in performing step i), the optical header is formed to include a depression of a size sufficient to support the first substrate member.

* * * * *